US008634419B2

(12) United States Patent
Oberdorfer

(10) Patent No.: US 8,634,419 B2
(45) Date of Patent: Jan. 21, 2014

(54) RELIABLE AND FAST METHOD AND SYSTEM TO BROADCAST DATA

(75) Inventor: Matthias Oberdorfer, Menlo Park, CA (US)

(73) Assignee: Violin Memory Inc., Santa Clara, CA (US)

(*) Notice: Subject to any disclaimer, the term of this patent is extended or adjusted under 35 U.S.C. 154(b) by 92 days.

(21) Appl. No.: 12/957,967

(22) Filed: Dec. 1, 2010

(65) Prior Publication Data

US 2012/0140770 A1 Jun. 7, 2012

(51) Int. Cl.
*H04L 12/28* (2006.01)
(52) U.S. Cl.
USPC .......................................................... 370/390
(58) Field of Classification Search
USPC .......................................................... 370/390
See application file for complete search history.

(56) References Cited

U.S. PATENT DOCUMENTS

| | | | |
|---|---|---|---|
| 4,706,080 A | 11/1987 | Sincoskie | |
| 5,459,725 A * | 10/1995 | Bodner et al. | 370/390 |
| 6,269,080 B1 * | 7/2001 | Kumar | 370/236 |
| 6,519,634 B1 | 2/2003 | Song et al. | |
| 6,661,790 B1 * | 12/2003 | Nolan et al. | 370/392 |
| 6,693,907 B1 * | 2/2004 | Wesley et al. | 370/390 |
| 6,990,098 B1 * | 1/2006 | Eberle et al. | 370/390 |
| 7,013,157 B1 | 3/2006 | Norman et al. | |
| 7,031,308 B2 | 4/2006 | Garcia-Luna-Aceves et al. | |
| 2002/0054572 A1 * | 5/2002 | Saleh et al. | 370/254 |
| 2002/0091846 A1 | 7/2002 | Garcia-Luna-Aceves et al. | |
| 2002/0150094 A1 * | 10/2002 | Cheng et al. | 370/389 |
| 2002/0174168 A1 * | 11/2002 | Beukema et al. | 709/201 |
| 2003/0058804 A1 * | 3/2003 | Saleh et al. | 370/254 |
| 2003/0088692 A1 * | 5/2003 | Badovinatz et al. | 709/237 |
| 2004/0062267 A1 | 4/2004 | Minami et al. | |
| 2004/0165607 A1 | 8/2004 | Carnevale et al. | |
| 2004/0244006 A1 * | 12/2004 | Kaufman et al. | 718/105 |
| 2005/0015460 A1 * | 1/2005 | Gole et al. | 709/213 |
| 2008/0123579 A1 * | 5/2008 | Kozat et al. | 370/312 |
| 2008/0288577 A1 | 11/2008 | Clubb et al. | |

OTHER PUBLICATIONS

Dharmasanam, Srinivas, Using an RTOS to Implement Symmetric Multiprocessing, Unknown, for Pillar Data Systems, pp. 1-11, (Date Unknown).
Intel, "MultiProcessor Specification" Unknown (May 1997), 90 pages.
Kleiman, Steven et al., "Symmetric Multiprocessing in Solaris 2.0", SunSoft, Inc. (Mountain View, CA), pp. 1-6, (Unknown).
Sheldon, Tom, "Clustering", Linktionary.com. pp. 1-4 (Oct. 12, 2004).

(Continued)

*Primary Examiner* — Hong Cho
(74) *Attorney, Agent, or Firm* — Brinks Gilson & Lione

(57) ABSTRACT

A reliable and scalable system and method of broadcasting information to other computer nodes in a communication network requires only O(2) time steps. According to one aspect, after broadcasting data in O(1) steps to all nodes in the network, the system and method provides a distributed reliability protocol to ensure data delivery which only requires an additional O(1) steps. Therefore, unlike in prior art approaches where the root or co-root is responsible for the reliable data delivery, each node in the network takes on responsibility to deliver the message to a partner/neighborhood node. The broadcasting method and system of the can be used as building block for most collective/distributive operations, and provides a significant performance advantage in parallel computer systems that have multicast/broadcast capabilities.

26 Claims, 8 Drawing Sheets

(56) References Cited

OTHER PUBLICATIONS

Sheldon, Tom, SAN (System Area Network), Linktonary.com, pp. 1, (Oct. 12, 2004).
Sheldon, Tom, "Switch Fabrics and Bus Design", Linktionary.com, pp. 1-2, (Oct. 12, 2004).
Tumenbayar, E., "Linux SMP HowTo" 4th ed. Linux pp. 1-32 (Jul. 9, 2002).
Zabatta, F. et al., "A Thread Performance Comparison: Windows NT and Solaris on a Symmetric Multiprocessor" Proc. 2nd USENIX Windows NT Symposium pp. 1-11 (Aug. 3-4, 1998).
Office Action from U.S. Appl. No. 11/242,596, dated Jul. 17, 2008, 10 pages.
Response to Office Action for U.S. Appl. No. 11/242,596, dated Nov. 17, 2008, 7 pages.
Office Action from U.S. Appl. No. 11/242,596, dated Mar. 18, 2009, 7 pages.
Response to Office Action for U.S. Appl. No. 11/242,596, dated Jun. 18, 2009, 8 pages.
Office Action from U.S. Appl. No. 11/242,596, dated Oct. 15, 2009, 14 pages.
Levine, Brian Neil et al., "A comparison of reliable multicast protocols," Multimedia Systems 6, Springer-Verlag, 1998, pp. 334-348.
Shin, M.Y. et al., "RRMP: A Ring-based Reliable Multicast Protocol for Concurrent Multicast," In: Proceedings of International Conference on Telecommunications 2000, 2000, Chapter II and Chapter III, 5 pages.
International Search Report for International Application No. PCT/US2011/062215, dated Jun. 25, 2012, 2 pages.

\* cited by examiner

RELIABLE AND FAST METHOD AND SYSTEM TO BROADCAST DATA

TECHNICAL FIELD

The present invention relates generally to data broadcasting, and in particular to reliable and fast broadcasting of information in a system comprising a plurality of nodes.

BACKGROUND

Parallel computing systems such as computer clusters, Symmetric Multiprocessor (SMP) computers and other architectures are becoming increasingly affordable and cost-effective for a wide range of applications. Many of these systems are built from commodity and relatively inexpensive computer parts connected with high speed networks (such as LANs, proprietary interconnects, etc.) or System Area Networks (SANs). These types of computing systems compete with the historically expensive custom-built supercomputers.

Most programming models provide for writing parallel applications, and many parallel applications take advantage of collective/distributive communication operations. Moreover, many scientific applications rely exclusively on collective/distributive operations for their communication. Thus, providing a high performance and scalable collective/distributive communication method for broadcasting information is critical for the operation and success of commodity based parallel computing systems.

A key issue in providing a high performance and scalable collective/distributive communication method is to reliably and quickly broadcast a message from a root process to multiple other processes in a group. Current methods need at least $O(\log n)$ steps to deliver a message reliably to n nodes. This means the effort and time to reliably broadcast data increases logarithmically with the number of nodes.

FIGS. 1A to 1C are block diagrams for illustrating in more detail the conventional approaches to broadcasting data in a parallel computing scheme.

As shown in FIG. 1A, the simplest method to broadcast data is to send it one by one to each recipient in the group. With n total number of nodes, this method will take n sends and n receives. The number of steps is thus $O(2n)$.

A straightforward improvement to the method in FIG. 1A is to use the broadcast/multicast capability of certain interconnects (such as Ethernet, Infiniband, etc.). However, such broadcast and multicast protocols support only unreliable datagram services which do not guarantee reliable data delivery. To take advantage of hardware supported broadcast/multicast capability therefore, an additional reliability protocol needs to be in place. All known approaches and prior art implement this reliability protocol as either (1) a simple method where every recipient sends an acknowledgement directly back to the root or (2) a reverse tree-based confirmation method where the leaves start sending the confirmation to co-roots and finally informing the main root that the message was delivered.

For example, in connection with the first improvement as shown in FIG. 1B, the root node sends data using multicast, while the other nodes are waiting for it. If the message is received, an acknowledgement (ACK) is sent back to the root node. The root blocks and waits for all ACKs to be received. If not all ACKs arrive within a certain period of time, it times out and re-transmits the message. This method is $O(n+1)$, where sending is $O(1)$ and returning the confirmations is $O(n)$.

The second improvement takes advantage of tree-based algorithms, which are based on point-to-point communication operations. Similar to a snow-ball principle, the root sends to multiple nodes, who in return, send each to multiple nodes, until the leaves are reached. In a tree-based method, the number of steps to reach leaf nodes increases with the total number nodes n typically in a logarithmic manner $O(\log n)$.

More particularly, as shown in FIG. 1C, contrary to the scheme in FIG. 1B, after the multicast by the root sender, to avoid the serial ACK hitting the sender all at the same time (a condition known as "ACK implosion"), a hierarchical structure is used for ACK collection and thus distributes the load to a number of nodes. In a tree based structure to collect ACKs, all nodes form a tree structure with the root node being the root of the tree. Intermediate nodes are responsible for collecting ACKs for their children. A variation is called the co-root scheme where, in addition to the root node, a subset of other nodes are selected as co-roots which receive the data in a reliable manner. The remaining nodes are called leaf nodes. Each of the root and the co-roots is responsible for a group of leaf nodes and performs as described above. These types of methods are using $O(\log n)$ steps for n number of nodes.

Although the tree-based scheme improves throughput, delays still increase as the number of nodes increase (although by a slower logarithmic factor of log n).

And there are sources for additional delays even in a tree-based implementation. For example, broadcasting is typically implemented as a blocking operation to ensure that the operation does not return at the root node until the communication buffer can be reused. Accordingly, if a message gets lost in the communication network, the reliability protocol will re-send the message and the communication buffer has to keep the original message until the last node has confirmed receipt. For a receiving node, the operation returns only after the broadcast data has been delivered to the respective receive buffer. This blocking requirement can therefore introduce significant delays, especially as the number of nodes increase and the chances of communication interruptions increase correspondingly.

Another disadvantage of tree-based methods is that if intermediate nodes that are expected to forward broadcast data are busy, they delay the forwarding which has an adverse impact on the execution time of an application.

Accordingly, it would be desirable if there were a reliable method that needed only a fixed number of steps for distributive/collective communication functions in parallel computing systems and would allow the use of simple commodity based cluster computers to achieve similar performance compared to a custom-built supercomputer.

SUMMARY

A reliable and scalable system and method of broadcasting information to other computer nodes in a communication network in $O(2)$ time steps is disclosed. According to one aspect, after broadcasting data in $O(1)$ steps to all nodes in the network, the system and method provide a distributed reliability protocol to ensure its delivery which only requires an additional $O(1)$ steps. Therefore, unlike in approaches where the root or co-root is responsible for the reliable data delivery, each node in the network takes on responsibility to deliver the message to a partner/neighbor node. The broadcasting method and system can be used as building block for most collective/distributive operations, and provides a significant performance advantage to all known parallel computer systems that have hardware supported multicast/broadcast capabilities.

According to one embodiment, a method of sharing data among a plurality of nodes comprises sending the data to all of the nodes and, at each of the nodes that received the data, sending an acknowledgment corresponding to the sent data to a respective designated sender node among other ones of the nodes.

According to another embodiment, an apparatus for sharing data among a plurality of nodes comprises means for sending the data to all of the nodes and, at each of the nodes that received the data, means for sending an acknowledgment corresponding to the sent data to a respective designated sender node among other ones of the nodes.

According to another embodiment, a system for sharing data among a plurality of nodes comprises, at each of the nodes, a designated sending node ID, a designated receiving node ID, a network interface for receiving a message containing the shared data, and a reliability protocol that causes a first acknowledgment to be sent using the designated sending node ID in response to the message being received.

DETAILED DESCRIPTION

The system and method will now be described in detail with reference to the drawings, which are provided as illustrative examples so as to enable those skilled in the art to practice the system and method. Notably, the figures and examples below are not meant to limit the scope of the claimed invention to any specific embodiment, but other embodiments are possible by way of interchange of some or all of the described or illustrated elements. Moreover, where certain elements of the system and method can be partially or fully implemented using known components, only those portions of such known components that are necessary for an understanding of the claimed invention will be described, and detailed descriptions of other portions of such known components will be omitted. In the present specification, an embodiment showing a singular component should not necessarily be considered limiting; rather, other embodiments including a plurality of the same component may be possible, and vice-versa, unless explicitly stated otherwise herein. Moreover, applicants do not intend for any term in the specification or claims to be ascribed an uncommon or special meaning unless explicitly set forth as such. Further, the claimed invention encompasses present and future known equivalents to the known components referred to herein by way of illustration.

Generally, the disclosed system and method provides a fundamentally different approach to broadcasting data to all processes in a parallel computing system. Whereas a known systems and methods require the root sending process to wait until acknowledgements are collected from all processes (either directly or through a hierarchical structure), the disclosed system and method distributes the acknowledgement collection function among all the nodes in the system.

According to one embodiment, each node in the system has a designated send partner/neighbor node and a designated receive partner/neighbor node. Once a node receives a message from its designated receive partner/neighbor, it behaves as though it itself was the original multicast sender. It waits for an ACK from its designated send partner/neighbor, and re-sends the message if a time-out occurs.

Although the data broadcasting techniques disclosed herein may find particularly useful application in a parallel computing system, the principles of the claimed invention are not limited to this application, and other applications will become apparent to those skilled in the art after being taught by the present disclosure.

Figure 1A:
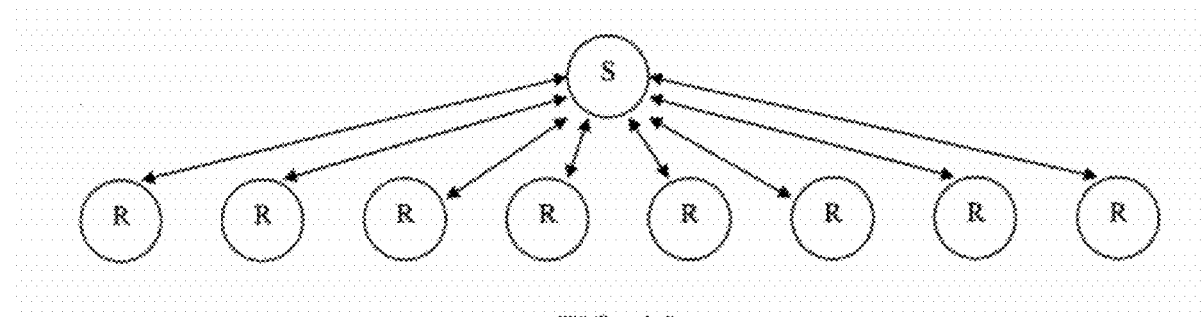
FIGS. 1A to 1C are block diagrams illustrating conventional approaches to reliable data broadcasting.
Figure 1B:
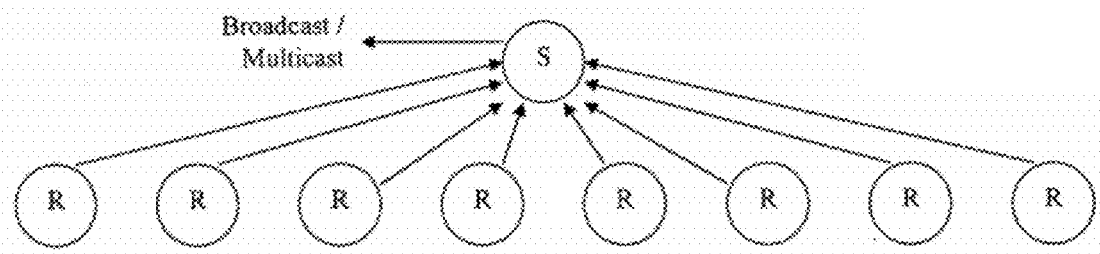
Figure 1C:
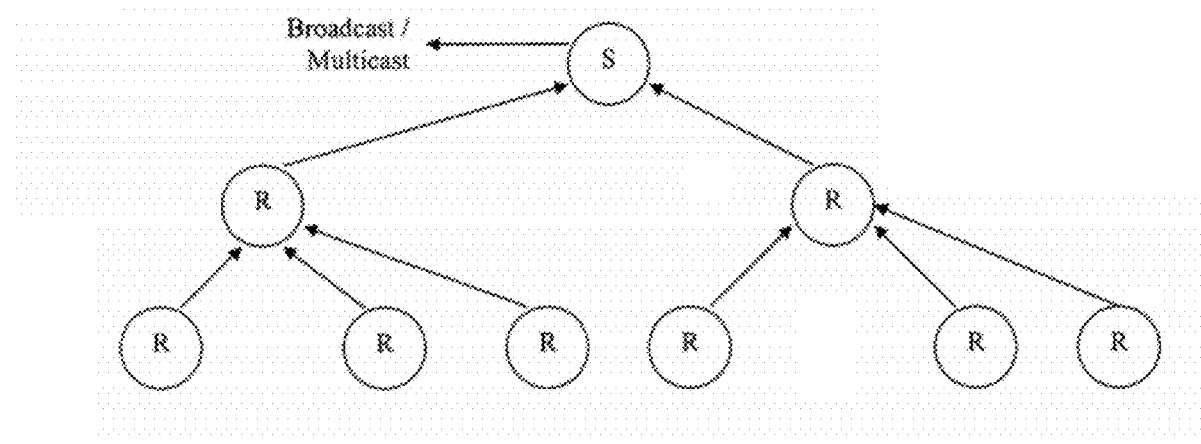
Figure 2:
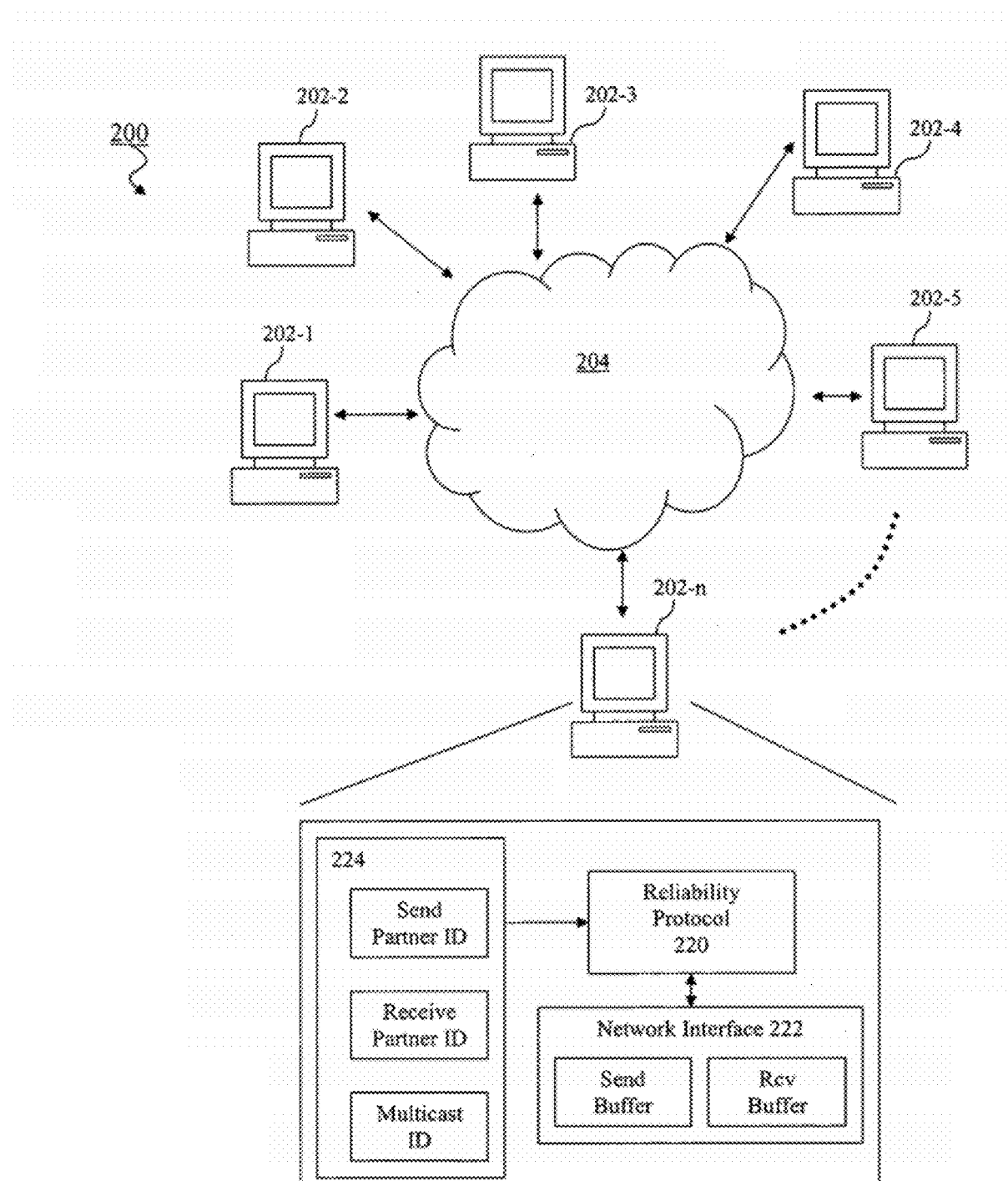
FIG. 2 is a block diagram illustrating an example system implementing a broadcasting method and system.

FIG. 2 is a block diagram of a system having data broadcasting capabilities. As shown in FIG. 2, a system 200 includes a plurality of nodes or processors 202-1 to 202-$n$ that communicate with each other via a network 204.

The data broadcasting capabilities can have many applications, and the diagram in FIG. 2 is intended to be illustrative rather than limiting. The system 200 can implement a parallel computing system such as a computer cluster, a Symmetric Multiprocessor (SMP) system or other architecture, and can also implement shared and distributed memory systems such as network attached storage (NAS) caches, virtual memory disks, coherent memory pools, and further can implement schemes such as SAN synchronization and file-locking and software clusters. Processors 202 can be any type of computer or processor using any type of operating system such as Windows, Linux, Solaris, Unix etc. Network 204 can be any type of high speed or other network such as Ethernet, Infiniband, proprietary interconnects, switch fabrics, buses or System Area Networks (SANs).

FIG. 2 illustrates an example implementation of processor 202 in more detail. As shown in FIG. 2, processor 202 includes a reliability protocol functionality 220 and a network interface 222 that includes a send buffer and a receive buffer. Processor 202 also includes a local memory or other storage 224 that includes a send partner ID, a receive partner ID and a multicast ID for use by the reliability protocol functionality 220. It should be noted that processor 202 may include other hardware and software components whose descriptions are not necessary for an understanding of the concepts disclosed herein, and so their explanation will be omitted here for clarity.

Reliability protocol functionality 220 is preferably implemented as software in accordance with the particular operating system and computing environment of processor 202 and provides the distributed message broadcast acknowledgment collection methodology, as will be described in more detail below, in conjunction with the ID's maintained in storage 224. The protocol functionality is further preferably implemented in accordance with the type of network protocol being used such as IP, UDP or Infiniband, and the system and the method are amenable to application with any packet-based protocol, and preferably having broadcast or multicast capabilities, and may be designed to, for example, to operate at Level 5 of the OSI stack.

Network interface 222 is implemented in accordance with the requirements of the particular network 204 in which the system operates, as well as the operating system and CPU capabilities of the processor 202. For example, if the network is an Ethernet LAN, the network interface 222 is an Ethernet-compatible interface. Those skilled in the art will be able to understand and implement the particular network interface appropriate for a given implementation. The ID's maintained in storage 224 are also implemented in accordance with the particular network 204 in which the system operates. For example in some embodiments, the ID's can be IP addresses, and the multicast ID can be a subnet. In other embodiments, the ID's can be maintained as lists of proprietary, machine level or other types of addresses.

It should be noted that it is not necessary for all processors 202 in system 200 to be configured the same. However, the reliability protocol functionality 220 is preferably present at each node in the system in accordance with the computing capabilities of that node.

Figure 3:
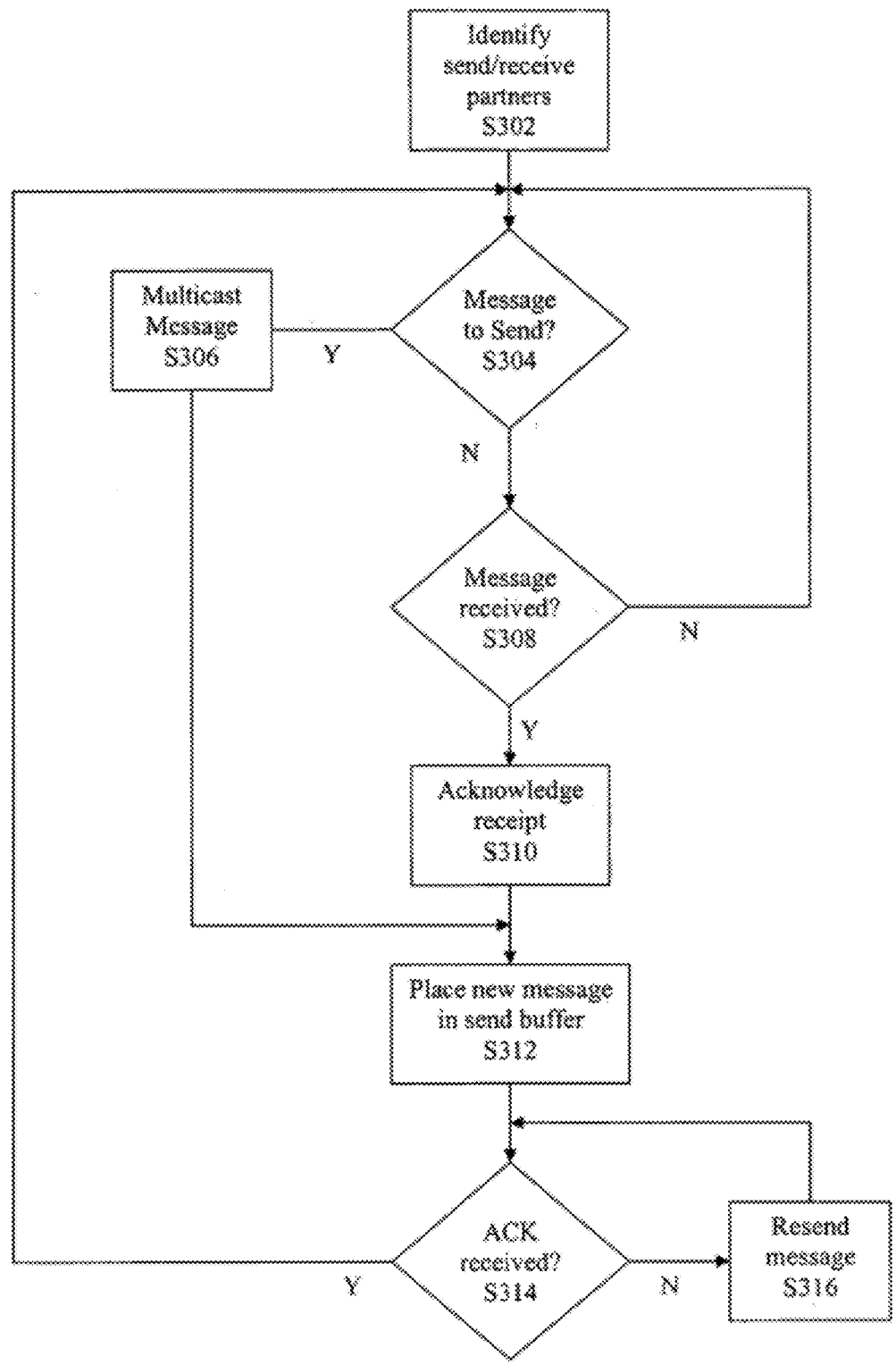
FIG. 3 is a flowchart illustrating in more detail an example broadcasting method.

FIG. 3 is a flowchart illustrating an example method of broadcasting data in a parallel computing system. Those skilled in the art will understand how to implement this methodology in various processor systems and software environments after being taught by this example.

As shown in FIG. 3, processing begins in step S302 by identifying all the nodes in the system and informing each node who their designated send partner/neighbor and designated receive partner/neighbor nodes are. This can be done many ways and can depend on the type of network and protocol that is used. However, preferably the identification step ensures that all nodes in the system are identified as both a designated receiver of another node, and a designated sender of a different node. For example, each node in the system can be given an identifying sequential number, and its send partner/neighbor can be the next highest number node, and its receive partner/neighbor can be the next lowest number node, with a modulus of the total number of nodes. Alternatively, a distance (or time delay) between each node can be measured, and a determination can be made to assign partner/neighbor nodes based on a minimum distance (or time delay) among nodes. In other embodiments, each node can also obtain ID's for all other nodes in the system, whether an explicit list of a group identifier such as an IP multicast group, subnet mask, broadcast lists, etc. After learning the IDs, these are stored in each respective node's storage 224.

In step S304, during processing, the system allows any node to broadcast data at any time. When a node is ready to send data, processing advances to step S306 where the data is multicast to all the nodes in the system, preferably using the broadcast or multicasting techniques of the particular network.

If no message is to be sent, processing proceeds to step S308, where it is determined whether a new broadcast message has been received that is associated with the system. If no message is to be sent, or to be received, by the node, processing returns to step S304.

If a new broadcast message for the system has been received, unless the node itself sent the message in step S306, the node sends an acknowledgement (ACK) to its designated receive partner/neighbor in step S310. Further, in step S312, both the node that sent the message, and every node that receives the message, stores the message locally in a send buffer associated with its designated send partner/neighbor node.

In step S314, after buffering the message, the node waits for an acknowledgement (ACK) from its designated send partner/neighbor (whether or not it actually sent the message in its send buffer). If the node receives an ACK from the send partner/neighbor, it deletes the message from the send buffer because the ACK provides confirmation that the message was delivered.

If no ACK is received from the designated send neighbor/partner node after a timeout period of time (determined in step S314), the node re-sends the message to its designated send neighbor/partner node in step S316 and wait again for an ACK in step S314. This behavior ensures that the message will be delivered to the partner/neighbor that did not receive the message with the first multicast.

FIGS. 4A to 4E further illustrate an example implementation of the broadcasting method.

Figure 4A:
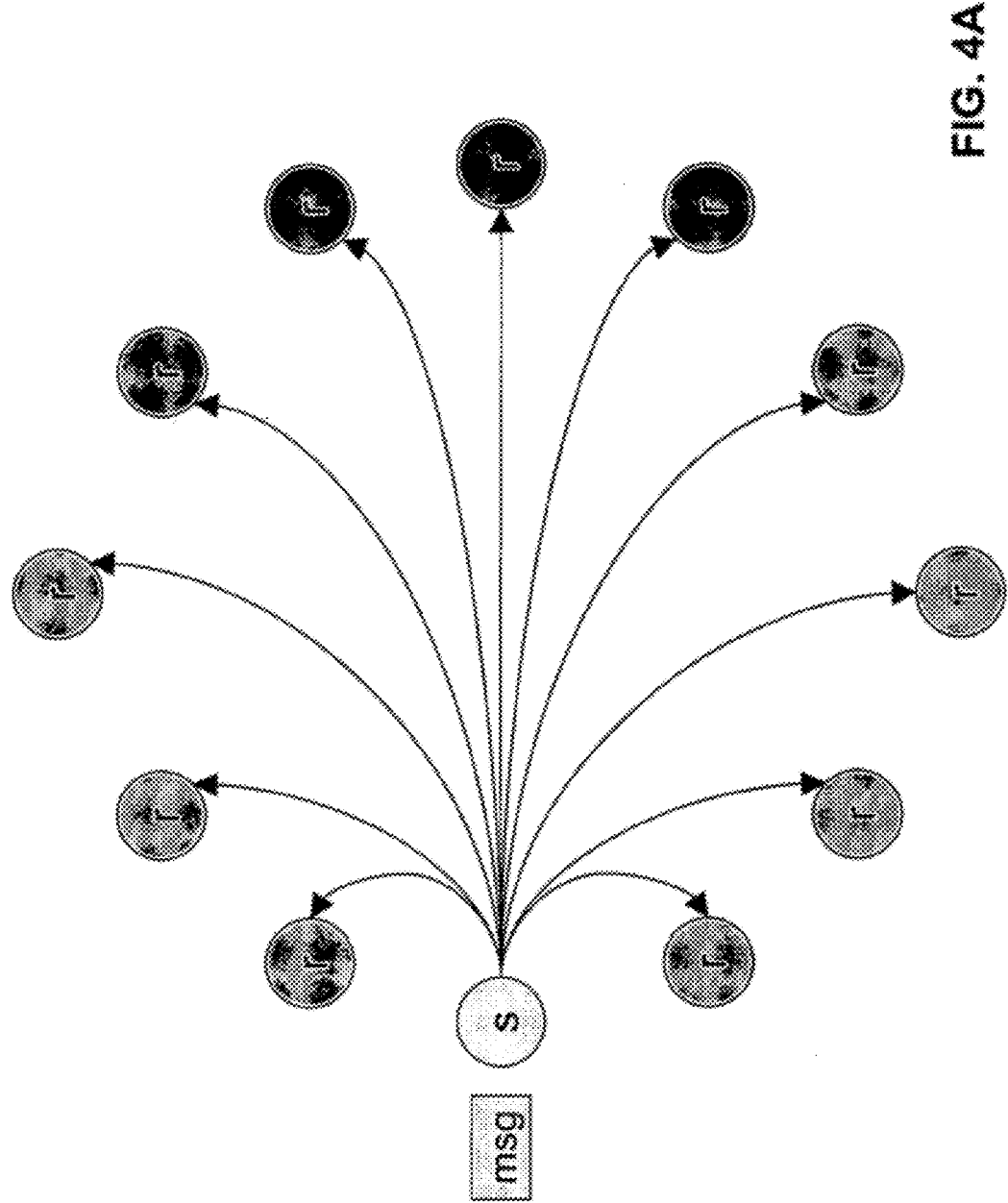
FIGS. 4A to 4E are diagrams further illustrating an example application of the broadcasting system and method.

As shown in FIG. 4A, similarly to the conventional method, the sender node s sends data over the network using the broadcast/multicast capability that the network hardware provides. After the message is delivered, each node r stores the message locally in a send buffer. Differently from the conventional method, however, each node that receives the message also pretends that it sent the message itself to a designated send partner/neighbor node, and that it received the message from a designated receive partner/neighbor.

Figure 4B:
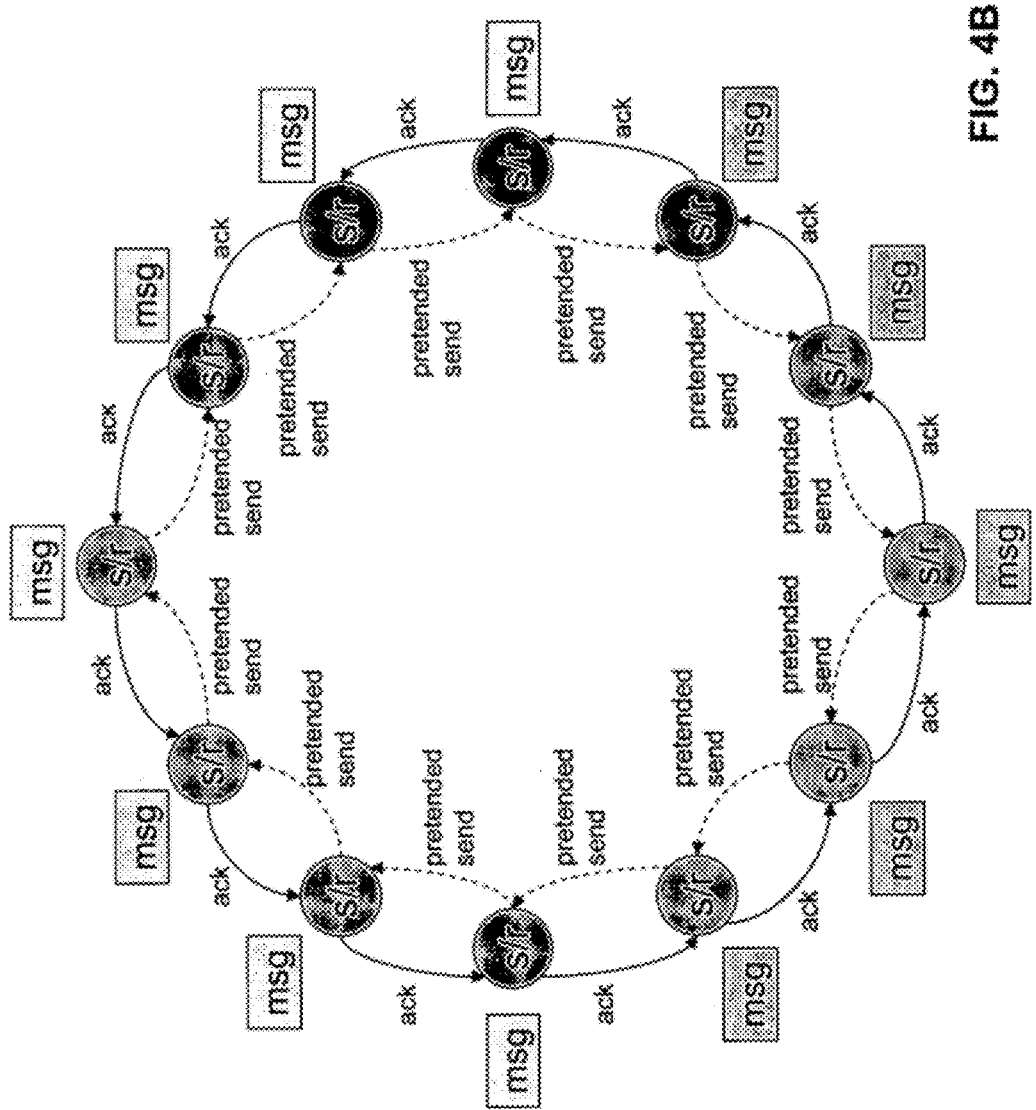

As shown in FIG. 4B, in the case of being the pretend sender, each node waits for an acknowledgement (ACK) from its designated send partner/neighbor. If the node receives an acknowledgement from the partner/neighbor, it deletes the message from the send buffer since it received confirmation that the message was delivered. In the case of being the receiver, each node sends an acknowledgment (ACK) back to its designated receive partner/neighbor node.

If no message is lost, all nodes send the acknowledgement (ACK) at approximately the same time, thus taking up one single time step O(1). In this case, all nodes receive an ACK, delete the message from the send buffer and continue the program.

An important aspect of the system and method is that it provides the ability to automatically recover from a situation where data is lost or dropped and one or more nodes do not receive the multicast data. In such a case, the node which pretended to be the sender will run into a timeout since it did not receive an ACK.

Figure 4C:
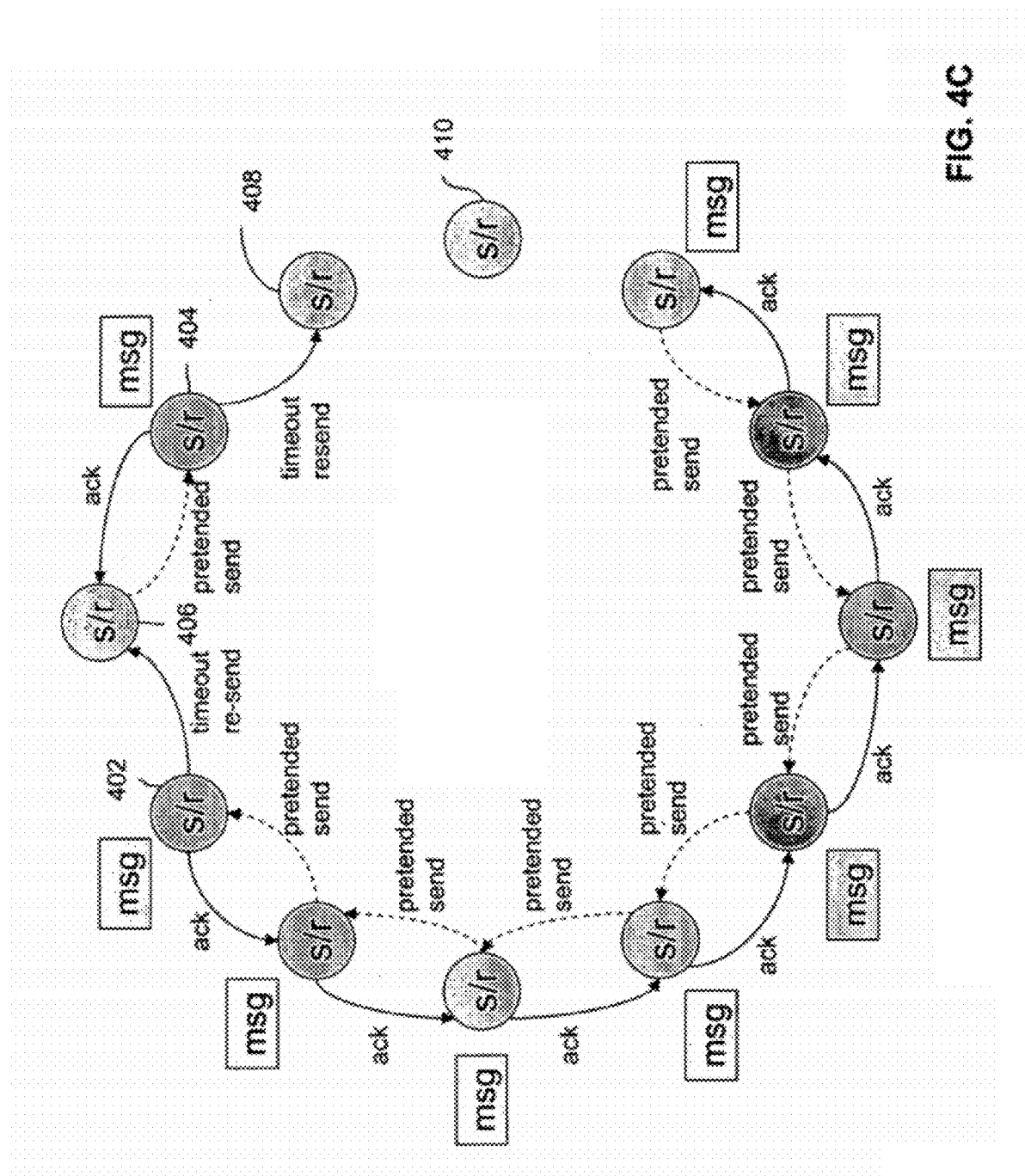
Figure 4D:
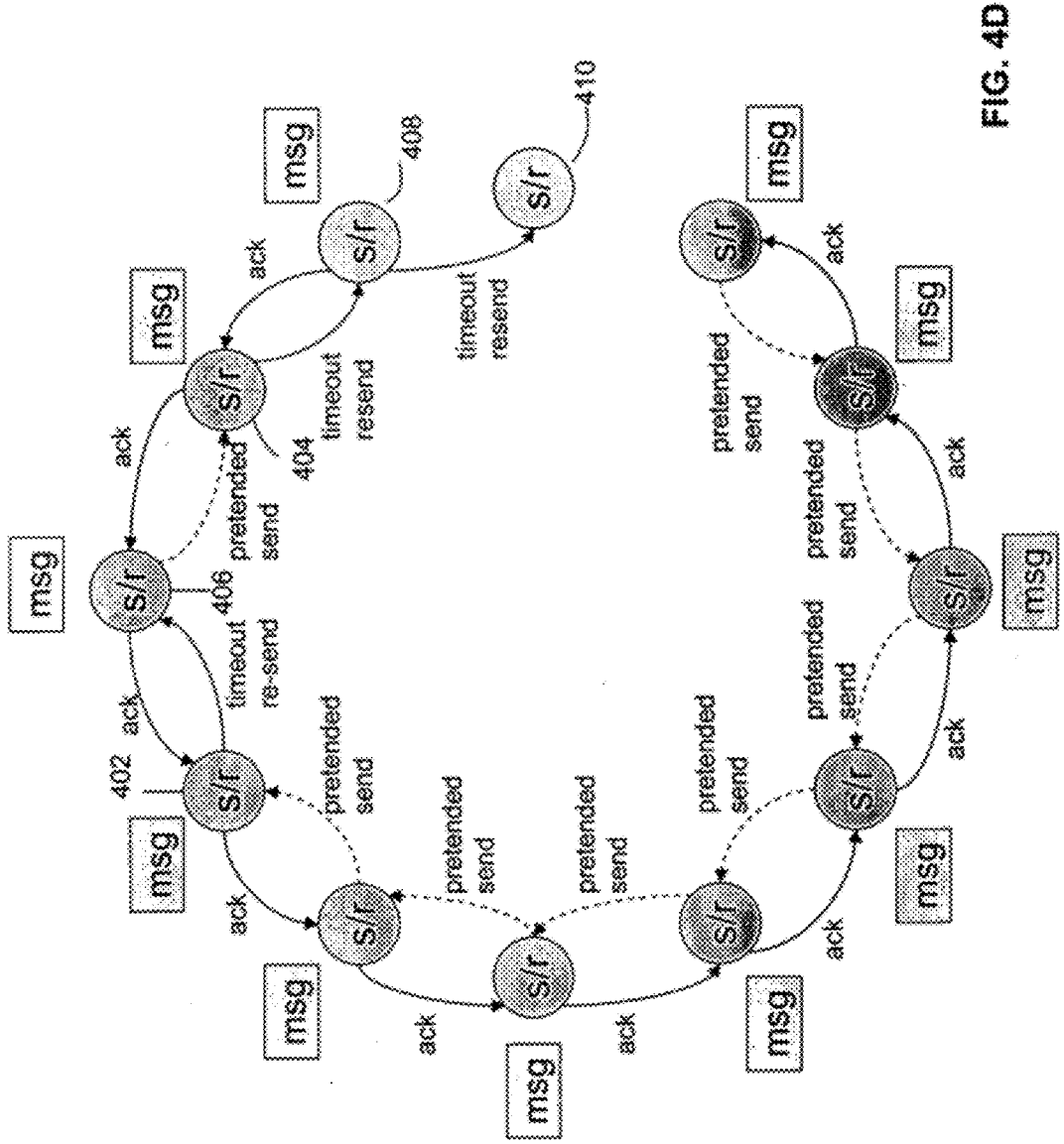

More particularly, as shown in FIG. 4C, nodes 402 and 404 did not receive an ACK from their designated send neighbor/partner nodes 406 and 408, respectively. The pretending senders 402 and 404 will thus re-send the message to neighbor/partner nodes 406 and 408 and wait again for an ACK. This behavior ensures that the message will be delivered to the partner/neighbor that did not receive the message with the first multicast.

The disclosed system and method may overcome an extreme situation where more than one node in the sequence of partners/neighbors does not receive the original multicast message. In this situation, the reliability method will still work and close the gap.

Figure 4E:
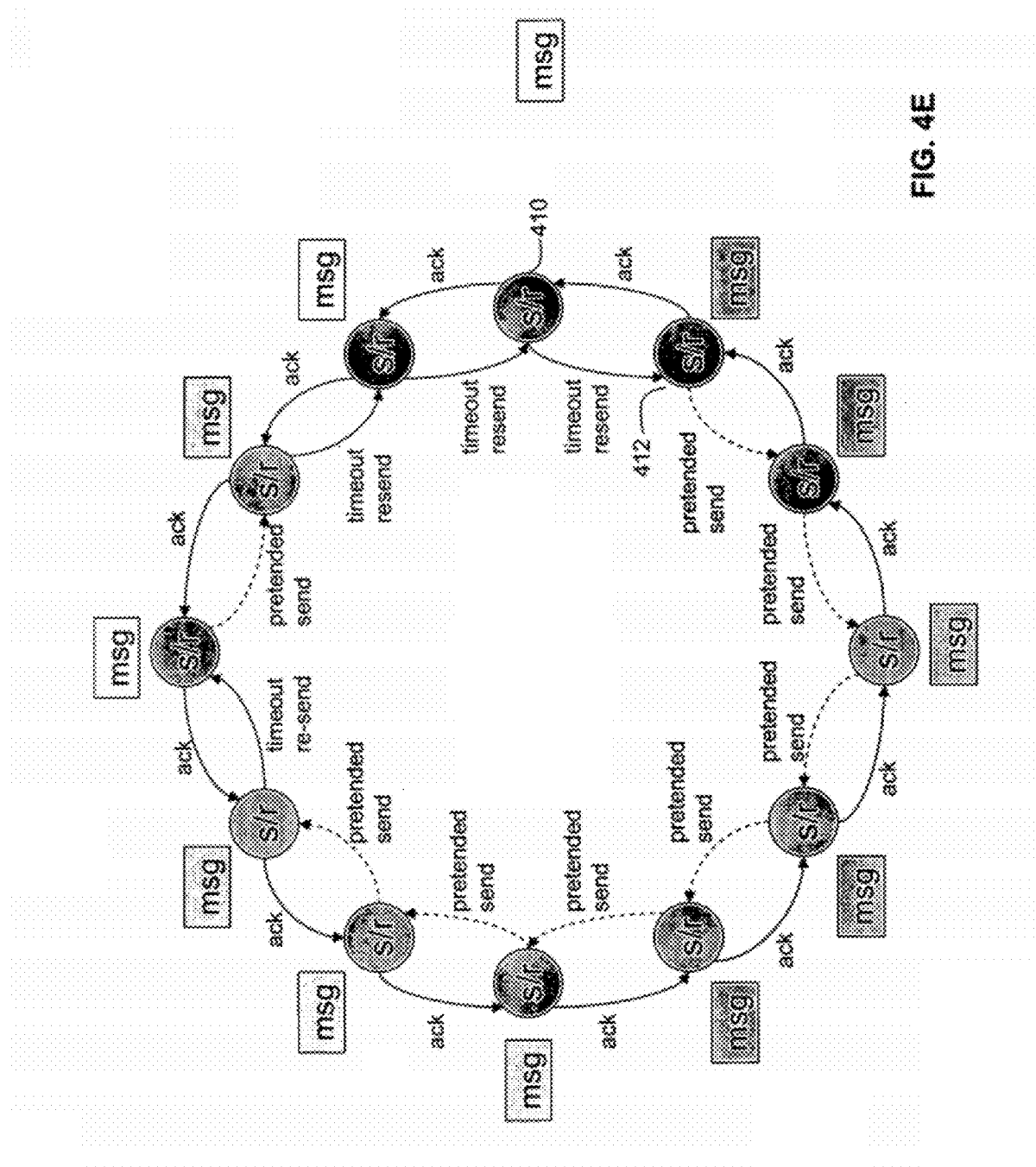

More particularly, referring back to FIG. 4C, node 410 never received the original message, and its designated send partner/neighbor node 408 did not receive the original message either. However, as explained above, and as illustrated in FIG. 4D, node 408 eventually receives and acknowledges the re-sent message from node 404. Upon receiving the message from node 404, node 408 begins its timer for receiving an acknowledgement of its own, and times out after not receiving an acknowledgement from its own send partner/neighbor node 410. It then "resends" the message (even though it never sent one originally) to node 410. Accordingly, as shown in FIG. 4E, node 410 eventually acknowledges receipt of the last message, and then completes the loop by performing identical processing as described above in connection with its own designated send partner/neighbor node 412.

Although the claimed invention has been particularly described with reference to embodiments thereof, it should be readily apparent to those of ordinary skill in the art that changes and modifications in the form and details may be made without departing from the spirit and scope of the invention. Certain aspects of one embodiment may also be interchanged with the other embodiments. It is intended that the appended claims encompass such changes, modifications and interchanges.

What is claimed is:

1. A method of sharing data among a plurality of nodes, comprising:
providing each node of the plurality of nodes with a receive partner ID that designates a sender node from among the other nodes of the plurality of nodes from which it receives an acknowledgment of receiving shared data and a send partner ID that designates a receiver node from among the other nodes of the plurality of nodes to which it sends an acknowledgement of receiving shared data;
sending shared data from a source node of the plurality of nodes to the other nodes of the plurality of nodes; and
at each of the nodes receiving the shared data,
sending the acknowledgment of receiving the shared data to the respective designated sender node using the receive partner ID; and,
waiting for the acknowledgment of receiving the shared data from the respective designated receiver node using the send partner ID, without regard to which node of the plurality of nodes is the source node,
wherein the shared data is not considered to have been received by the node receiving the shared data until a second acknowledgment having the designated receiver node ID is received by the node receiving the shared data and each step of sending shared data or sending the acknowledgement is performed in a time period of the order of a time step.

2. The method according to claim 1, wherein the sharing of data is completed within an interval of the order of 2 time steps.

3. The method according to claim 2, further comprising, at each of the nodes that received the shared data:
sending the shared data to the designated receiver node having the send partner ID if the acknowledgment of receiving the shared data is not received within a predetermined time interval.

4. The method of claim 3 where the predetermined time interval is greater than a time duration of the order of two time steps.

5. The method of claim 4, wherein a value of a time step for transmitting the shared data and receiving the shared data by another node is independent of the number of nodes of the plurality of nodes.

6. The method of claim 3, wherein a time step is approximately the time interval for transmitting the shared data and receiving the shared data at another node.

7. The method according to claim 1, wherein the data sending step is performed using a broadcast message.

8. The method according to claim 1, wherein the data sending step is performed using a multicast message.

9. The method according to claim 1, wherein the nodes comprise a parallel computing system.

10. The method according to claim 1, wherein the nodes comprise a network attached storage cache.

11. The method according to claim 1, wherein the nodes comprise a virtual memory disk.

12. The method according to claim 1, wherein the nodes comprise a storage area network.

13. The method according to claim 1, wherein the nodes comprise a computer cluster.

14. The method according to claim 1, wherein the providing step is performed such that each node of the plurality of nodes is associated with a single designated sender node having a receive partner ID for sending the acknowledgement to the node and a designated single receiver node having a send partner ID for waiting for the acknowledgment to be sent in response to receiving sent shared data.

15. The method of claim 1, wherein the source node is any node of the plurality of nodes.

16. A system for sharing data among a plurality of nodes, each node of the plurality of nodes having a node ID, comprising:
a source node of the plurality of nodes, configured to transmit the shared data to at least a first, a second and a third node, each of the first, the second and the third nodes being configured such that each of the nodes has:
a designated sending node ID of a node of the first, the second or the third nodes;
a designated receiving node ID of a node of the first, the second, or the third nodes, the sending node ID and the receiving node ID identifying different nodes of the first, the second, or the third node;
a network interface at each node for receiving the shared data; and
wherein a first acknowledgment is sent by the node receiving the shared data to another of the first, the second or the third nodes designated by the sending node ID, and the shared data is not considered to have been received by the node receiving the shared data until a second acknowledgment having the designated receiver node ID is received by the node receiving the shared data, even if the node receiving the shared data did not send the shared data to the node having the designated receiver node ID.

17. The system according to claim 16, wherein the shared data re-sent using the designated receiver node ID if the second acknowledgment is not received within a predetermined time interval.

18. The system according to claim 16, wherein the shared data is sent using a broadcast message.

19. The system according to claim 16, wherein the shared data is sent using a multicast message.

20. The system of claim 16, wherein the sharing of the data transmitted by the source node is completed in a time period of the order of the twice the maximum transmission time between two nodes of the plurality of nodes.

21. The system of claim 16, wherein the source node is one of the first, the second, or the third nodes.

22. A method of reliably broadcasting data in a network comprising:
providing a group of nodes selected from a plurality of nodes, each node capable of receiving data from other nodes of plurality of nodes;
transmitting data from a source node of the group of nodes to the other nodes of the group of nodes; and
at each node of the group of nodes capable of receiving data from the source node, sending an acknowledgement of receiving data from the source node to another node of the group of nodes,
wherein a first node of the group of nodes is paired with a second node of the group of nodes as a receiver of a first acknowledgement from the second node, and with a third node of the group of nodes as a transmitter of a second acknowledgement to the first node, the first and the second acknowledgments being for reception of the data from the source node.

23. The method of claim 22, wherein the source node is any one of the nodes of the group of nodes.

24. The method of claim 23, wherein the data is sent from the source node to the other nodes of the group of nodes in not more than two transmission time periods, including the transmission of the acknowledgment to the another node.

25. The method of 22, further comprising the steps of:
receiving data at a first node of the group of nodes;
transmitting the second acknowledgement to the third node;
waiting a predetermined time for the first acknowledgement from the second node; and
transmitting the data received from the source node to the second node if the predetermined time is exceeded without receiving the first acknowledgement.

26. The method of claim 25, wherein the predetermined time is of the order of the transmission time of the data from the source node to the second node.

* * * * *

UNITED STATES PATENT AND TRADEMARK OFFICE
CERTIFICATE OF CORRECTION

PATENT NO. : 8,634,419 B2  Page 1 of 1
APPLICATION NO. : 12/957967
DATED : January 21, 2014
INVENTOR(S) : Matthias Oberdorfer It is certified that error appears in the above-identified patent and that said Letters Patent is hereby corrected as shown below:

In the Claims

In column 8, claim 20, line 40, after "of the order of" delete "the".

In column 9, claim 25, line 1, after "The method of" insert --claim--.

Signed and Sealed this
Nineteenth Day of August, 2014

Michelle K. Lee
*Deputy Director of the United States Patent and Trademark Office*